United States Patent
Fujimoto et al.

(10) Patent No.: US 10,054,197 B2
(45) Date of Patent: Aug. 21, 2018

(54) SHIFTER GEAR

(71) Applicant: HONDA MOTOR CO., LTD., Tokyo (JP)

(72) Inventors: Yasushi Fujimoto, Wako (JP); Hiroyuki Makita, Wako (JP); Yasuhiro Higashi, Wako (JP); Taku Hirayama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 322 days.

(21) Appl. No.: 14/939,978

(22) Filed: Nov. 12, 2015

(65) Prior Publication Data
US 2016/0245369 A1 Aug. 25, 2016

(30) Foreign Application Priority Data

Sep. 30, 2014 (JP) .................................. 2014-200012

(51) Int. Cl.
| *F16H 3/38* | (2006.01) |
| *F16H 3/22* | (2006.01) |
| *F16H 3/16* | (2006.01) |
| *F16H 55/17* | (2006.01) |
| *F16H 57/04* | (2010.01) |

(52) U.S. Cl.
CPC ................. *F16H 3/22* (2013.01); *F16H 3/16* (2013.01); *F16H 55/17* (2013.01); *F16H 57/043* (2013.01); *F16H 2055/178* (2013.01)

(58) Field of Classification Search
CPC .......................... F16D 2023/0631; F16D 11/14

USPC .......................................................... 74/339
See application file for complete search history.

(56) References Cited

U.S. PATENT DOCUMENTS

| 3,612,235 | A | * | 10/1971 | Ashauer | .................. | F16D 23/06 |
| | | | | | | 192/109 R |
| 3,618,724 | A | * | 11/1971 | Oehl | ........................ | F16D 23/06 |
| | | | | | | 192/53.343 |
| 4,660,707 | A | * | 4/1987 | Sadanori | .................. | F16D 23/06 |
| | | | | | | 192/53.34 |
| 6,354,417 | B1 | * | 3/2002 | Narita | ..................... | F16D 11/10 |
| | | | | | | 192/108 |
| 8,925,410 | B2 | * | 1/2015 | Asada | ..................... | F16D 23/06 |
| | | | | | | 192/53.31 |

FOREIGN PATENT DOCUMENTS

JP         2001-208766 A        8/2001

* cited by examiner

*Primary Examiner* — Ha Dinh Ho
(74) *Attorney, Agent, or Firm* — Birch, Stewart, Kolasch & Birch, LLP

(57) ABSTRACT

A shifter gear for reducing a thrust load that occurs in a shifter gear for restraining friction between the shifter gear and a shift fork. A gear part and an engaging part with the shift fork are disposed at an outer periphery of a base part. The spline is disposed at an inner periphery of the base part. The shifter gear is mounted relatively slidable to a gear shift shaft in an axis direction via the spline and is mounted to be incapable of relative rotation around an axis. The shift fork engaging the engaging part is configured to perform a slide operation on the shifter gear. One part of the spline is configured with a splined collar in an axis direction. The splined collar is a different body from the base part and is able to relatively rotate to the part around an axis.

16 Claims, 3 Drawing Sheets

SHIFTER GEAR

CROSS-REFERENCE TO RELATED APPLICATIONS

The present application claims priority under 35 USC 119 to Japanese Patent Application No. 2014-200012 filed Sep. 30, 2014 the entire contents of which are hereby incorporated by reference.

BACKGROUND OF THE INVENTION

1. Field of the Invention

The present invention relates to a shifter gear.

2. Description of Background Art

A shifter gear is known that meshes with a gear (G6) and is disposed between gears (G2) and (G4) on a gear shift shaft. See, for example, JP-A No. 2011-208766. The shifter gear slides on the shaft by an operation of shift forks (not shown) to selectively mesh with the gear (G2) or the gear (G4). This shifter gear includes a base part, a gear part (a gear part that meshes with the gear (G6)), engaging parts (ring-shaped recessed grooves) with the shift forks, and splines. The gear part is disposed at the outer periphery of this base part. The engaging parts are disposed at the outer periphery of the base part. The splines are disposed at the inner periphery of the base part. The shifter gear is mounted relatively slidable to the gear shift shaft in an axis direction via the splines. The shifter gear is mounted so as to be incapable of relative rotation around the axis. The shift forks engaging the engaging parts perform the slide operation on the shifter gear.

The above-described conventional shifter gear has a large amount of offset between the center of the gear part as a power transmission unit and the center of the spline as the power transmission unit in the axis direction. Thus, due to a load balance of the input and the output of the power, a load in a thrust direction is likely to occur in the shifter gear. Such thrust load causes friction at the engaging part between the shift fork and the shifter gear. Furthermore, the thrust load also acts as a force attempting to bring the shifter gear down in the axial direction, further facilitating the friction.

SUMMARY AND OBJECTS OF THE INVENTION

A problem solved by an embodiment of the present invention is to provide a shifter gear that reduces the thrust load that occurs in the shifter gear and therefore can restrain a friction between the shifter gear and the shift fork.

To solve the problem, a shifter gear of an embodiment of the present invention includes a base part, a gear part, an engaging part with a shift fork, and a spline. The gear part is disposed at an outer periphery of the base part. The engaging part with the shift fork is disposed at an outer periphery of the base part. The spline is disposed at an inner periphery of the base part. The shifter gear is mounted relatively slidable to a gear shift shaft in an axis direction via the spline. The shifter gear is mounted to be incapable of relative rotation around an axis. The shift fork engaging the engaging part is configured to perform a slide operation on the shifter gear. One part of the spline is configured with a splined collar in an axis direction. The splined collar is a different body from the base part. The splined collar is able to relatively rotate to the base part around an axis. With this shifter gear, the one part of the spline is configured with the splined collar in the axis direction. The splined collar is a different body from the base part. The splined collar can relatively rotate to the base part around the axis. Accordingly, the one part of the spline, which is configured with this splined collar, basically does not act as a power transmission unit. This allows for decreasing an amount of offset between a center of the gear part as the power transmission unit and a center of the spline as the power transmission unit. This reduces a thrust load that occurs in the shifter gear, to ensure the restraining the friction between the shifter gear and the shift fork. It is to be noted that, although the splined collar does not act as the power transmission unit, the splined collar serves as a supporting part that prevents the shifter gear from falling over in the axial direction.

According to an embodiment of the present invention, the splined collar is disposed at a position displaced off from the gear part in an axis direction. With this configuration, the splined collar can effectively prevent the shifter gear from falling over in the axial direction.

According to an embodiment of the present invention, the splined collar is disposed on an opposite side from the gear part in an axis direction sandwiching the engaging part with the shift fork. With this configuration, the splined collar can effectively prevent the shifter gear from falling over in the axial direction.

According to an embodiment of the present invention, the splined collar includes an oil passage. The oil passage is configured to supply lubricating oil to the engaging part with the shift fork. This configuration supplies the lubricating oil to the part between the shift fork and the engaging part, ensuring effectively restraining the friction between both.

According to an embodiment of the present invention, the base part is provided with a stopper that is attachable/removable to the base part. The stopper is configured to prevent the splined collar from coming off in an axis direction. This configuration allows enhancing assembly of the splined collar to the base part.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2(*b*) is a partially omitted side view of a splined collar; and

DETAILED DESCRIPTION OF THE PREFERRED EMBODIMENTS

Figure 1:
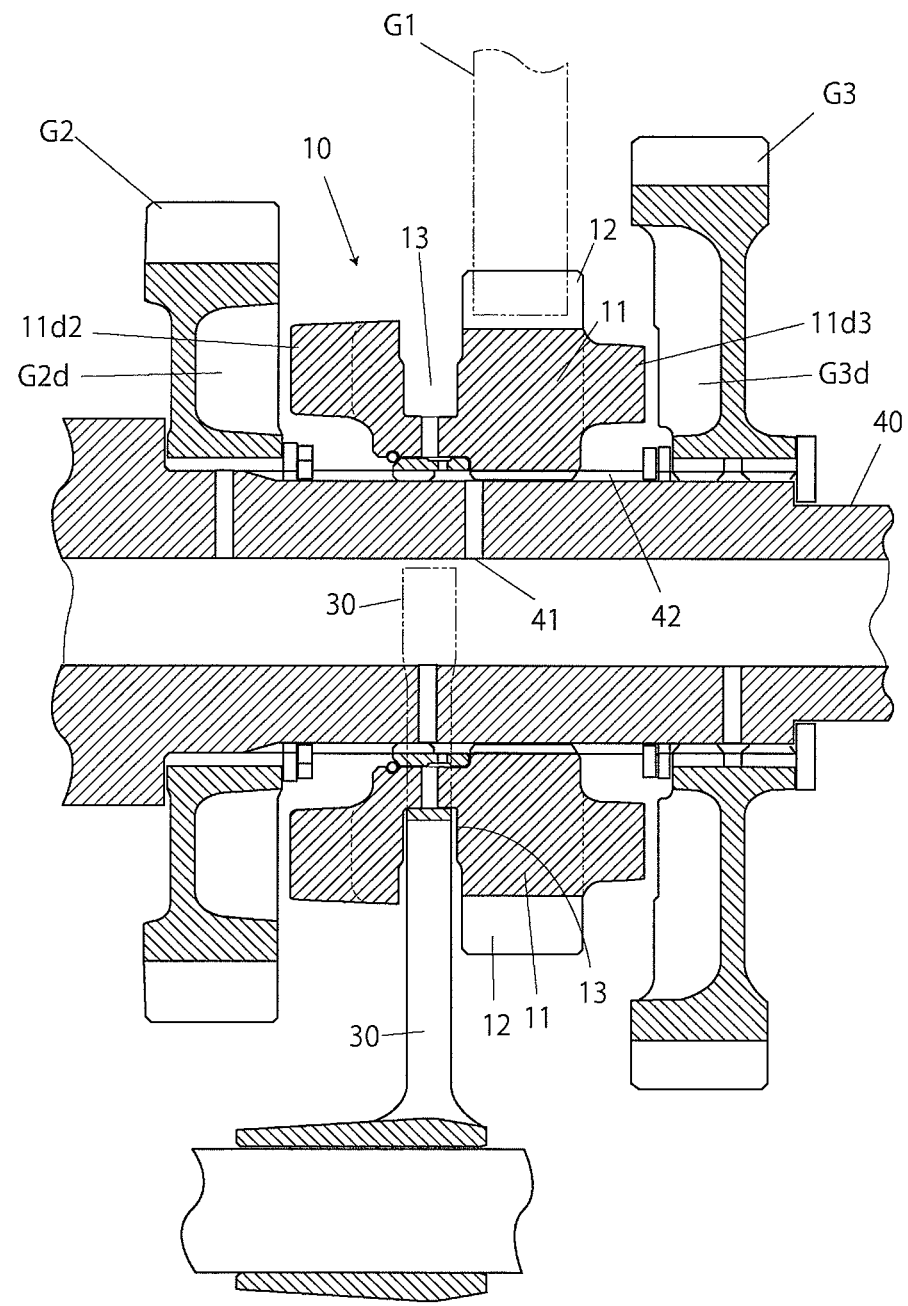
FIG. 1 is a drawing showing a usage example of a shifter gear of one embodiment according to the present invention.
Figure 2A:
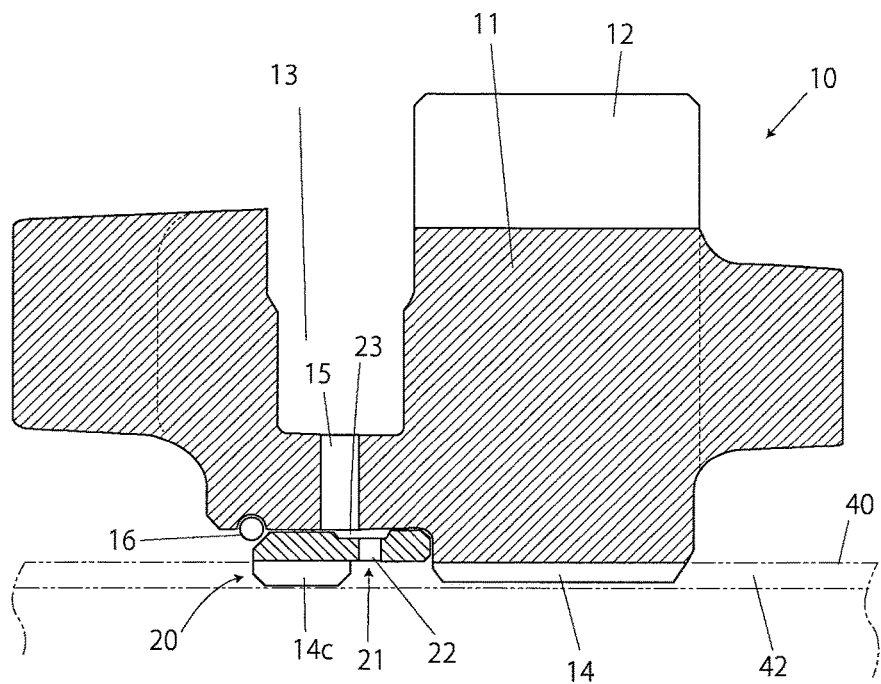
FIG. 2(*a*) is a partially enlarged cross-sectional view of the shifter gear of one embodiment according to the present invention.
Figure 2B:
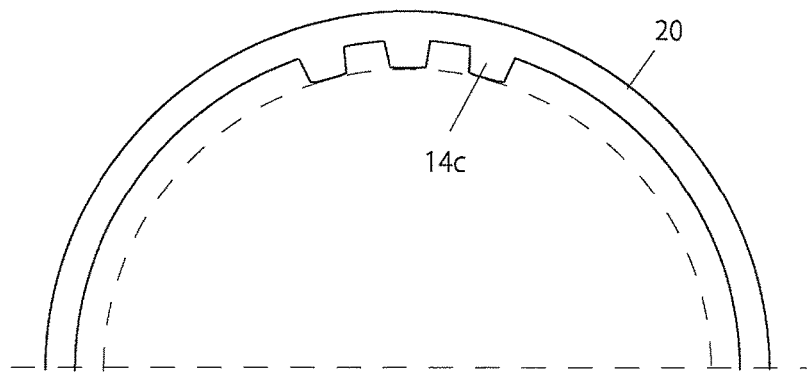

An embodiment of a shifter gear according to the present invention will be described below by referring to the accom- As shown in FIG. 1 and FIGS. 2(a) and 2(b), a shifter gear 10 of this embodiment includes a base part 11, a gear part 12, an engaging part 13 with a shift fork 30, and a spline 14. The gear part 12 is disposed at the outer periphery of this base part 11. The engaging part 13 is disposed at the outer periphery of the base part 11. The spline 14 is disposed at the inner periphery of the base part 11.

As shown in FIG. 1, this shifter gear 10 is mounted to be relatively slidable in an axis direction and incapable of relative rotation around the axis to a gear shift shaft 40 via the spline 14. The gear shift shaft 40 rotates by a power from a power source. A spline of the gear shift shaft 40 is provided with the shifter gear 10, the gear part 12 meshing with a gear G1. The shift fork 30, which engages the engaging part 13, performs a slide operation on the shifter gear 10. The shifter gear 10 selectively engages the adjacent gear G2 or an adjacent gear G3 with a dowel to transmit the power while shifting the gear. Dowels 11d2 and 11d3 are provided for the shifter gear 10. G2d is a dowel hole of the gear G2 that can engage and disengage the dowel 11d2. G3d is a dowel hole of the gear G3 that can engage and disengage the dowel 11d3.

As shown in FIGS. 2(a) and 2(b), with the shifter gear 10, one part 14c of the spline 14 is configured with a splined collar 20 in the axis direction (the right-left direction in FIGS. 2(a) and 2(b)). The splined collar 20 is a different body from the base part 11. The splined collar 20 can relatively rotate to the base part 11 around the axis.

With this shifter gear 10, the one part 14c of the spline 14 is configured with the splined collar 20 in the axis direction. The splined collar 20 is a different body from the base part 11. The splined collar 20 can relatively rotate to the base part 11 around the axis. Accordingly, the one part 14c of the spline 14, which is configured with this splined collar 20, basically does not act as a power transmission unit (except for extremely slight power transmission caused by a friction between the base part 11 and the splined collar 20).

Figure 3A:
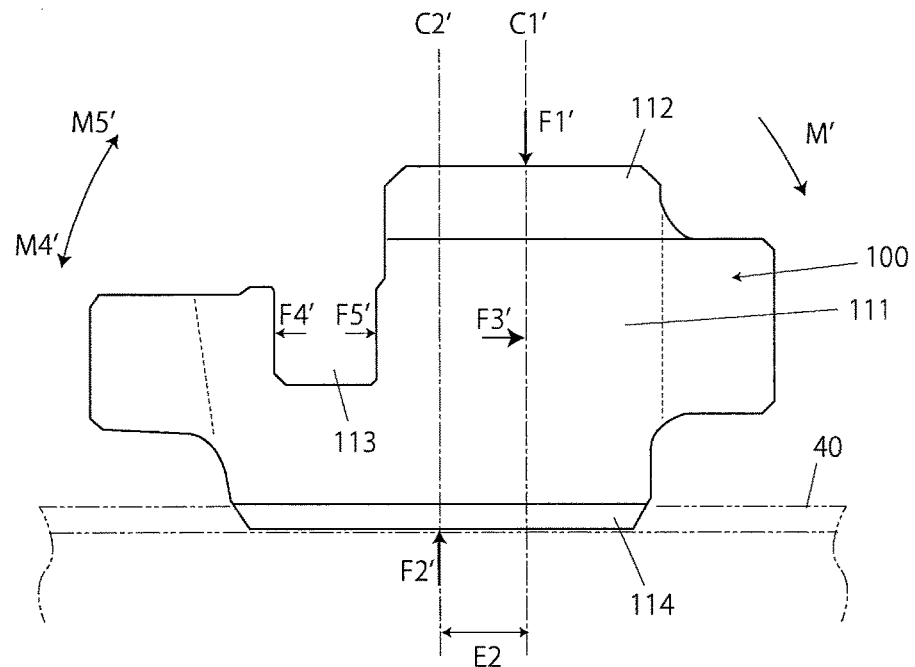
FIGS. 3(*a*) and 3(*b*) are action explanatory diagrams.
Figure 3B:
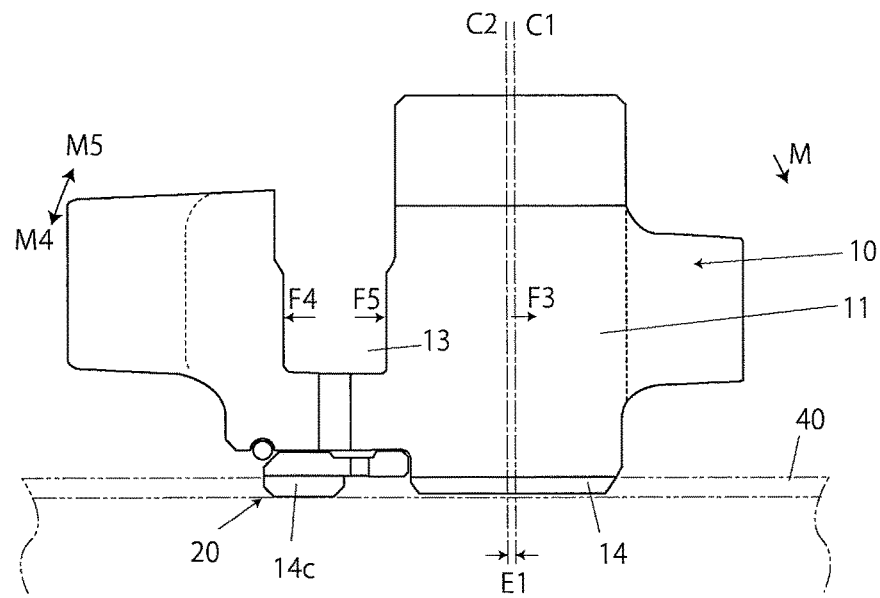

This allows for decreasing an amount of offset E1 between a center C1 of the gear part 12 as the power transmission unit (see FIG. 3(b)) and a center C2 of the spline 14 as the power transmission unit as much as possible. This reduces a thrust load (F3) that occurs in the shifter gear 10, ensuring restraining the friction between the shifter gear 10 and the shift fork 30. It is to be noted that, although the splined collar 20 does not act as the power transmission unit, the splined collar 20 serves as a supporting part that prevents the shifter gear 10 from falling over in the axial direction.

The following further describes the action of the shifter gear 10 of this embodiment referring to FIGS. 3(a) and 3(b). FIG. 3(a) is a drawing showing a comparative example (a shifter gear equivalent to the conventional technology). A shifter gear 100 includes a base part 111, a gear part 112, an engaging part 113 with a shift fork, and a spline 114. The gear part 112 is disposed at the outer periphery of this base part 111. The engaging part 113 is disposed at the outer periphery of the base part 111. The spline 114 is disposed at the inner periphery of the base part 111.

With such a shifter gear 100, to perform the slide operation by the shift fork, a sliding force F4' or F5' acts on the engaging part 113 with the shift fork. These sliding forces F4' and F5' act as a force M4' or M5', which are forces attempting to fall over the shifter gear 100 in the axial direction. Accordingly, to receive the forces, the spline 114 is disposed not only at a part corresponding to the gear part 112 but also at a part corresponding to the engaging part 113 with the shift fork.

With the conventional shifter gear 100, the entire spline 114 is integrally configured with the base part 111, serving as the power transmission unit. Thus, with the conventional shifter gear 100, an amount of offset E2 between a center C1' of the gear part as the power transmission unit and a center C2' of the spline as the power transmission unit is large in the axis direction. Accordingly, due to a load balance of an input and an output F1' and F2' of the power, a load F3' is likely to occur in the shifter gear 100 in the thrust direction. Such thrust load F3' causes a friction at the engaging part 113 between the shift fork and the shifter gear. Furthermore, the thrust load F3' also acts as a force M', which is a force attempting to fall over the shifter gear 100 in the axial direction, further facilitating the friction.

In contrast to this, as shown in FIG. 3(b), with the shifter gear 10 of this embodiment, the one part 14c of the spline 14 is configured with the splined collar 20 in the axis direction. The splined collar 20 is a different body from the base part 11. The splined collar 20 can relatively rotate to the base part 11 around the axis. Accordingly, the one part 14c of the spline 14, which is configured with this splined collar 20, basically does not act as the power transmission unit (except for extremely slight power transmission caused by the friction between the base part 11 and the splined collar 20).

This allows for the decreasing of the amount of offset E1 between the center C1 of the gear part 12 as the power transmission unit and the center C2 of the spline 14 as the power transmission unit. The center C1 of the gear part 12 can be matched with the center C2 of the spline 14 as the power transmission unit. In this case, the amount of offset E1 becomes 0. This reduces the thrust load F3 that occurs in the shifter gear 10, for ensuring the restraining of the friction between the shifter gear 10 and the shift fork 30.

It is to be noted that, with the shifter gear 10 of this embodiment as well, to perform the slide operation by the shift fork, a sliding force F4 or F5 acts on the engaging part 13 with the shift fork. These sliding forces F4 and F5 act as a force M4 or M5, which is the force attempting to fall over the shifter gear 10 in the axial direction. However, the splined collar 20 can receive the force M4 or M5. That is, the splined collar 20 does not act as the power transmission unit. However, the splined collar 20 serves as the supporting part, which prevents the shifter gear 10 from falling over in the axial direction. The slide operation causes the shifter gear 10 to selectively engage the adjacent gear G2 or G3 in FIG. 1. Furthermore, the gear part 12 performs power transmission with the gear G1. The gear shift shaft 40 may be a driving shaft or a driven shaft.

As shown in FIG. 1 and FIGS. 2(a) and 2(b), the splined collar 20 is disposed at a position displaced off from the gear part 12 in the axis direction. Thus, the splined collar 20 can effectively prevent the shifter gear 10 from falling over in the axial direction.

Moreover, the splined collar 20 is disposed on the opposite side from the gear part 12 in the axis direction sandwiching the engaging part 13 with the shift fork 30. Thus, the splined collar 20 can effectively prevent the shifter gear 10 from falling over in the axial direction.

The splined collar 20 includes an oil passage 21. The oil passage 21 supplies lubricating oil to the engaging part 13 with the shift fork 30. This configuration supplies the lubricating oil to the part between the shift fork 30 and the engaging part 13, ensuring effectively restraining the friction between the both. The oil passage 21 includes an orifice 22 and an oil passage 23 with a circular, recessed groove shape. The orifice 22 communicates with an oil passage 41 of the gear shift shaft 40. The oil passage 23 communicates with this orifice 22 and communicates with an oil passage 15 at the base part 11.

A stopper 16 is disposed at the base part 11 so as to be attachable/removable to the base part 11. The stopper 16 prevents the splined collar 20 from coming off in the axis direction. This configuration allows for enhancing the assembily of the splined collar 20 to the base part 11. The stopper 16 can be configured as a round clip.

The embodiments of the present invention have been described above. The present invention is not limited to the above-described embodiments. Modifications can be appropriately made without departing from the scope of the gist of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A shifter gear comprising:
a base part;
a gear part disposed at an outer periphery of the base part;
an engaging part with a shift fork disposed at an outer periphery of the base part; and
a spline disposed at an inner periphery of the base part, the shifter gear being mounted relatively slidable to a gear shift shaft in an axial direction via the spline, the shifter gear being mounted to be incapable of relative rotation around an axis, and the shift fork engaging the engaging part being configured to perform a slide operation on the shifter gear,
wherein one part of the spline is configured with a splined collar in the axial direction, the splined collar being a different body from the base part and being able to rotate relative to the base part.

2. The shifter gear according to claim 1, wherein the splined collar is disposed at a position displaced off from the gear part in the axial direction.

3. The shifter gear according to claim 1, wherein the splined collar is disposed on an opposite side from the gear part in the axial direction sandwiching the engaging part with the shift fork.

4. The shifter gear according to claim 1, wherein the splined collar includes an oil passage, the oil passage being configured to supply lubricating oil to the engaging part with the shift fork.

5. The shifter gear according to claim 1, wherein the base part is provided with a stopper that is attachable or removable to the base part, the stopper being configured to prevent the splined collar from coming off in the axial direction.

6. The shifter gear according to claim 2, wherein the splined collar is disposed on an opposite side from the gear part in the axial direction sandwiching the engaging part with the shift fork.

7. The shifter gear according to claim 2, wherein the splined collar includes an oil passage, the oil passage being configured to supply lubricating oil to the engaging part with the shift fork.

8. The shifter gear according to claim 3, wherein the splined collar includes an oil passage, the oil passage being configured to supply lubricating oil to the engaging part with the shift fork.

9. The shifter gear according to claim 2, wherein the base part is provided with a stopper that is attachable or removable to the base part, the stopper being configured to prevent the splined collar from coming off in the axial direction.

10. The shifter gear according to claim 3, wherein the base part is provided with a stopper that is attachable or removable to the base part, the stopper being configured to prevent the splined collar from coming off in the axial direction.

11. The shifter gear according to claim 4, wherein the base part is provided with a stopper that is attachable or removable to the base part, the stopper being configured to prevent the splined collar from coming off in the axial direction.

12. A shifter gear comprising:
a base member;
a gear formed on an outer periphery of the base member;
an engaging member with a shift fork disposed at the outer periphery of the base member; and
a spline formed on an inner periphery of the base member,
the shifter gear being mounted relatively slidable to a gear shift shaft in an axial direction via the spline, the shifter gear being mounted to be incapable of relative rotation around an axis, and the shift fork engaging the engaging part being configured to perform an axially slide operation on the shifter gear,
a splined collar extending in an axial direction, the splined collar being a distinct member relative to the base member and being able to rotate relative to the base member;
wherein the splined collar includes an oil passage, the oil passage being configured to supply lubricating oil to the engaging part with the shift fork.

13. The shifter gear according to claim 12, wherein the splined collar is disposed at a position displaced off from the gear member in the axial direction.

14. The shifter gear according to claim 12, wherein the splined collar is disposed on an opposite side from the gear member in the axial direction sandwiching the engaging part with the shift fork.

15. The shifter gear according to claim 12, wherein the splined collar is disposed on an opposite side from the gear member in the axial direction sandwiching the engaging part with the shift fork.

16. The shifter gear according to claim 12, wherein the base member is provided with a stopper that is attachable or removable to the base member, the stopper being configured to prevent the splined collar from coming off in the axial direction.

* * * * *